Sept. 29, 1936.  J. VERNER  2,055,640
PORTABLE FOAM COLUMN
Filed Dec. 20, 1934  2 Sheets-Sheet 1

Jules Verner Inventor
By W. E. Currie Attorney

Sept. 29, 1936.  J. VERNER  2,055,640
PORTABLE FOAM COLUMN
Filed Dec. 20, 1934  2 Sheets-Sheet 2
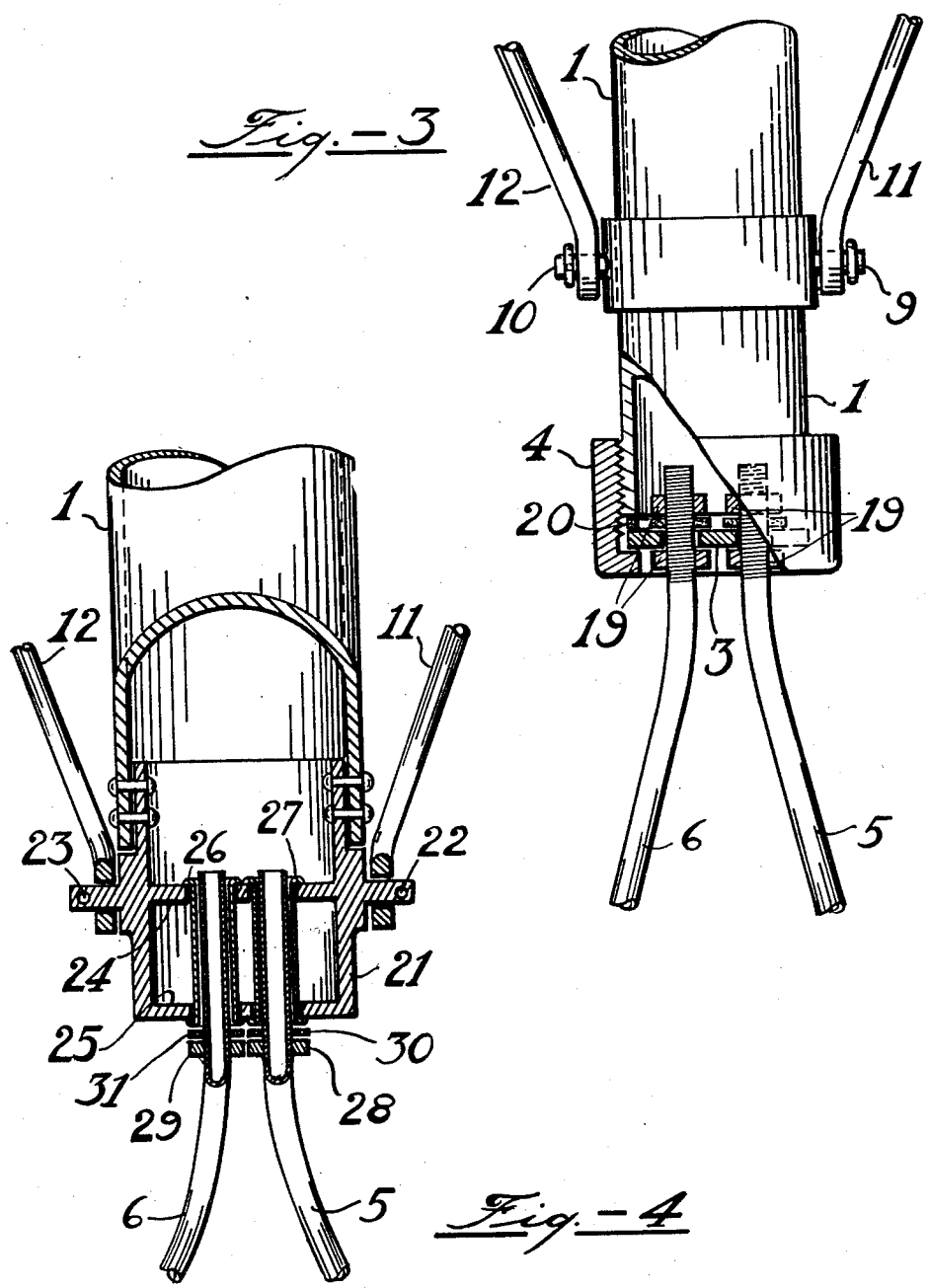
Jules Verner Inventor
By W. E. Currie Attorney Patented Sept. 29, 1936

2,055,640

UNITED STATES PATENT OFFICE 2,055,640

PORTABLE FOAM COLUMN

Jules Verner, Linden, N. J., assignor to Standard Oil Development Company, a corporation of Delaware Application December 20, 1934, Serial No. 758,474

10 Claims. (Cl. 169—4)

The present invention relates to an improvement in foam delivery devices and especially to a portable foam column for use in extinguishing oil tank fires with fire foam.

Although most storage tanks for inflammable liquids are provided with permanently installed foam delivery apparatus, when a fire therein is the result of an explosion the foam delivery system is usually destroyed or seriously damaged and it is customary to maintain emergency equipment which may be rapidly brought into service at any point required.

It is an object of my invention to provide an apparatus of the emergency type which may be brought to the point of use with the minimum expenditure of time and suitable for operation by a minimum number of men.

Figure 1:
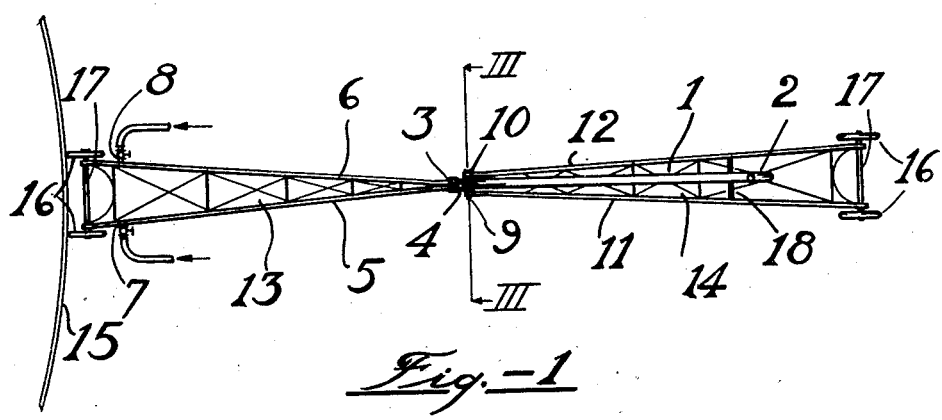
Figure 2:
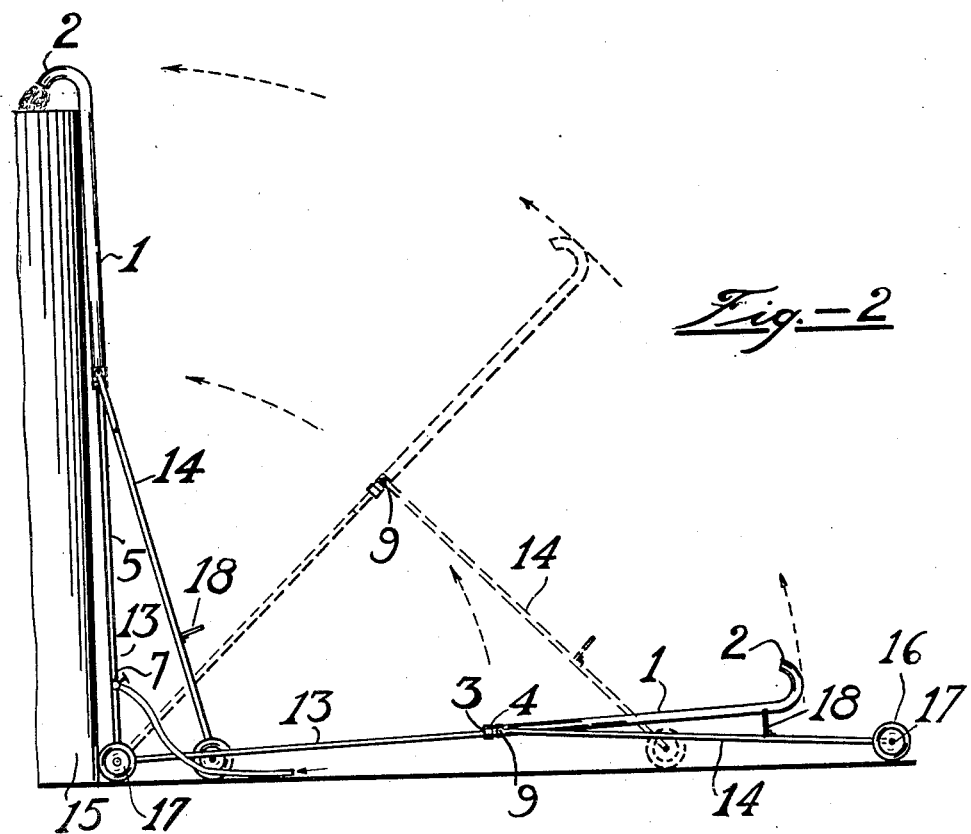

For a better comprehension of my invention, reference may be had to the accompanying drawings, wherein Fig. 1 is a plan view of the apparatus in a horizontal position against a tank wall. Fig. 2 is a side elevation of the apparatus in operating position illustrating by dotted lines the movement of the apparatus from its horizontal position to the vertical. Fig. 3 is a view of the lower end of the foam tube on a line III—III in Fig. 1. Fig. 4 is a sectional view of an alternate form of construction.

Referring now to the drawings, numeral 1 designates a foam delivery tube having a downwardly curved spout 2 at one end, numeral 3 designates a cover plate for the opposite end of the tube to which it may be secured by means of a flanged collar 4 adapted for threaded engagement with the end of the foam tube so that the apparatus may be conveniently divided into sections. Numerals 5 and 6 designate hollow tubular members rigidly joined to the cover plate and opening therethrough into the lower portion of the foam tube 1, numerals 7 and 8 designate hose connections on the tubular members 5 and 6 by means of which foam forming materials may be supplied to the foam tube with the tubular members acting as conduits. Numerals 9 and 10 designate trunnions affixed to the foam tube adjacent its lower end and to which are pivotally connected the ends of hollow tubular members 11 and 12. As may be observed from the drawings, members 5 and 6 and 11 and 12 diverge outwardly in opposite directions from the juncture of each pair with the foam tube to form a pair of triangular shaped frame sections 13 and 14 with the apex of one opposed to that of the other. Of these two triangular shaped sections, section 13 is rigidly joined to the foam tube 1 by means of the cover plate assembly and forms with the tube a single foam column unit which when raised is of a length sufficient to permit application of foam directly upon the surface of the contents of a storage tank. Section 14 being pivotally connected to the foam tube at 9 and 10 is adapted to raise the foam column unit to an operative position by the leverage exerted on the trunnions when a forward motion is imparted to this section and the base of section 13 is prevented from forward movement as by tank wall 15.

Wheels 16 are mounted on axles 17 affixed to the base of each of sections 13 and 14 to permit convenient movement of the apparatus from one place to another and to form bearings for the apparatus when being raised or lowered and a rest 18 is provided at a suitable point on section 14 which is adapted to receive the upper portion of the foam tube 1 when the apparatus is in a horizontal position and maintain the foam column unit at such an angle to section 14 that the forward motion thereof mentioned above will exert sufficient leverage at the trunnions 9 and 10 to raise the foam column unit.

The joining of the triangular sections 13 and 14 to the foam tube by means of members 5 and 6 and 11 and 12 are more clearly shown in Fig. 3 in which a section of the foam tube end has been cut away to illustrate one method of joining members 5 and 6 with the cover plate 3 through which they communicate with the lower portion of the foam tube and also to illustrate the sectional characteristics obtained by securing the cover plate 3 to the tube 1 by means of the flanged and threaded collar 4. In this figure numeral 19 designates lock nuts threaded on the ends of members 5 and 6 to join the cover plate thereto. Numeral 20 designates washers or gaskets for forming a fluid tight seal at the joint.

An alternate method of joining the triangular sections 13 and 14 to the foam tube is illustrated in Fig. 4. As shown in Fig. 4, the lower end of the foam tube 1 is secured to a casting 21 by riveting or welding. The casting is formed with trunnions 22 and 23 integral therewith and has an inner transverse wall 24 and an outer transverse wall 25. These walls have cooperating openings therein through which tubular members 26 and 27 are introduced and the ends rolled to form passageways into the foam tube adapted to provide a tight fit with the tubular members 5 and 6 which are inserted therein. In this alternate arrangement the tubular members 5 and 6 are provided with collars 28 and 29 which are secured to their upper ends and bear the weight of the assembled tube when the apparatus is in a vertical position. Gaskets 30 and 31 are provided to form a fluid-tight seal between the casting and the collars. As previously described, the tubular members 11 and 12 are pivotally connected to trunnions 22 and 23.

The arrangement thus described provides a slip-joint adapted to permit extremely rapid assembly of the foam column.

In operation the device may be wheeled to the scene of use in two separate sections, one consisting of the supporting frame section 13 and the cover plate assembly and the other the supporting frame section 14 with the foam tube mounted thereon. With section 13 in position against a tank wall, section 14 may be opposed to it and the cover plate joined to the foam tube by means of the collar provided for that purpose. It should be entirely obvious that when constructed of a light metal such as aluminum a foam delivery device is provided which is perfectly suited for emergency use; being extremely mobile and having an assembled weight not exceeding about 450 lbs., it is operable under almost any circumstances by no more than 2 or 3 men.

Although the invention has been disclosed by a description of its preferred form, it is not to be limited thereby, but only by the following claims in which it is my intention to claim all novelty inherent in the invention as broadly as the prior art permits.

I claim:

1. In a portable foam column, means for supporting and positioning said column comprising a pair of triangular frame sections formed of hollow tubular members of which one section is rigidly affixed to a cover plate for the lower end of said column and the other movably engages trunnions secured to and adjacent the lower end of said column and means integral with the rigidly affixed frame section for supplying foam to the column.

2. Apparatus according to claim 1 in which the means, integral with the rigidly affixed frame section for supplying foam to the column comprises conduits formed by the hollow tubular members of the frame section when affixed to the cover plate for the foam column in such manner as to extend therethrough into the lower portion of said column.

3. A portable foam delivery device comprising a sheet metal foam column section having a downwardly curving spout at its upper end and trunnions adjacent its lower end, a pair of hollow tubular members engaging the trunnions and extending outwardly at a narrow angle from the foam column to form a triangular frame, supporting section, a rest on the frame for the foam column and a pair of wheels mounted on an axle affixed to the frame at its widest portion, a cover plate for the end of the foam column, a pair of hollow tubular members joined to the plate and passing therethrough into the lower portion of the foam column, said tubular members extending outwardly from the foam column at a narrow angle to form a second supporting frame section, a pair of wheels mounted on an axle and affixed to said second frame at its widest portion and hose connections adjacent the lower ends of the said tubular members whereby foam forming materials may be supplied to the foam column through the conduits formed by the hollow tubular members of the frame.

4. A portable foam column, comprising a foam tube having a cover plate at its lower end, a pair of tubular members joined to the cover plate and passing therethrough into the lower portion of the foam tube, said tubular members extending outwardly at a narrow angle from the foam tube to form a triangular shaped supporting frame for said tube, wheels mounted on the frame at the base of the triangle formed and means integral with the frame for supplying foam forming materials to the foam tube, a second triangular shaped, wheeled, supporting frame section of tubular members pivotally connected to trunnions affixed to and adjacent the lower end of the foam tube whereby the column may be raised to a vertical position by the forward motion of the second frame section and a rest on said frame adapted to support the foam tube when in a substantially horizontal position.

5. A foam delivery device comprising a foam delivery tube having a discharge end, an elongated frame member one end of which is rigidly secured to the base of the foam tube forming a unit, a second elongated frame member, one end of which is pivotally connected to an intermediate portion of said unit, wheels supporting the other ends of the frame members whereby movement of the wheeled ends of the frame members toward one another elevates the foam unit to a vertical position and means integral with the first frame member for supplying foam forming materials to the tube.

6. A foam delivery device according to claim 5 in which the first frame is secured to the foam tube by means of a cover plate for the lower end to the foam tube rigidly secured to said frame and a flanged collar adapted for threaded engagement with the lower end of the foam tube whereby a fluid tight and rigid connection may be made between the cover plate and the foam tube.

7. A foam delivery device according to claim 5 in which the second frame is secured to the foam tube by means of a pair of trunnions secured to the foam tube at diametrically opposite points on an intermediate portion of said tube, the end of the frame being adapted to engage said trunnions in a suitable manner.

8. A foam delivery device according to claim 5 in which the means integral with the first frame for supplying foam forming materials to the foam tube comprises a pair of tubular members forming the sides of the frame having hose connections at their lower ends and adapted to serve as conduits communicating with the foam tube through a closure for the lower end thereof.

9. A sectional foam delivery device comprising a foam tube, a supporting frame section adapted for rigid engagement with the lower end of the foam tube to form a foam column unit, a second supporting frame section adapted for pivotal engagement with said foam tube at an intermediate point thereon and a rest associated with the pivotally engaged section adapted to maintain the foam column unit at an angle to said pivotally engaged section with the apparatus in a substantially horizontal position whereby leverage may be obtained to raise said foam column unit by the forward motion of the pivotally engaged section.

10. A foam delivery device according to claim 5, in which the base of the foam tube comprises a cylindrical closure telescopically associated with said tube for a portion of the length of the closure, the closure carrying on its outer surface at diametrically opposed points trunnions adapted for pivotal engagement with the second frame member.

JULES VERNER.